United States Patent [19]

Helmer et al.

[11] 3,742,214

[45] June 26, 1973

[54] APPARATUS FOR PERFORMING CHEMICAL ANALYSIS BY ELECTRON SPECTROSCOPY

[75] Inventors: John C. Helmer, Menlo Park; Norbert H. Weichert, Palo Alto, both of Calif.

[73] Assignee: Varian Associates, Palo Alto, Calif.

[22] Filed: Oct. 18, 1971

[21] Appl. No.: 190,265

Related U.S. Application Data

[63] Continuation of Ser. No. 763,691, Sept. 30, 1968.

[52] U.S. Cl................250/49.5 AE, 250/49.5 PE, 250/41.9 ME
[51] Int. Cl............................................ H01j 37/26
[58] Field of Search............ 250/49.5 AE, 49.5 ED, 250/49.5 PE, 41.9 ME

[56] References Cited
UNITED STATES PATENTS
3,686,501  8/1972  Taylor et al................. 250/49.5 AE Primary Examiner—Archie R. Borchelt
Assistant Examiner—B. C. Anderson
Attorney—Leon F. Herbert

[57] ABSTRACT

An electron spectrometer enabling the determination of the binding energies of the electrons surrounding the atoms of a given sample material. Novel sample irradiation apparatus, annular slit means and electron analyzing apparatus are disclosed including a novel arrangement which enables the electron spectrum to be swept without altering the parameters of the analyzer and further enables unusually large slit widths to be used in order to achieve extremely high instrument sensitivity.

40 Claims, 5 Drawing Figures

PATENTED JUN 26 1973 3,742,214
SHEET 1 OF 2
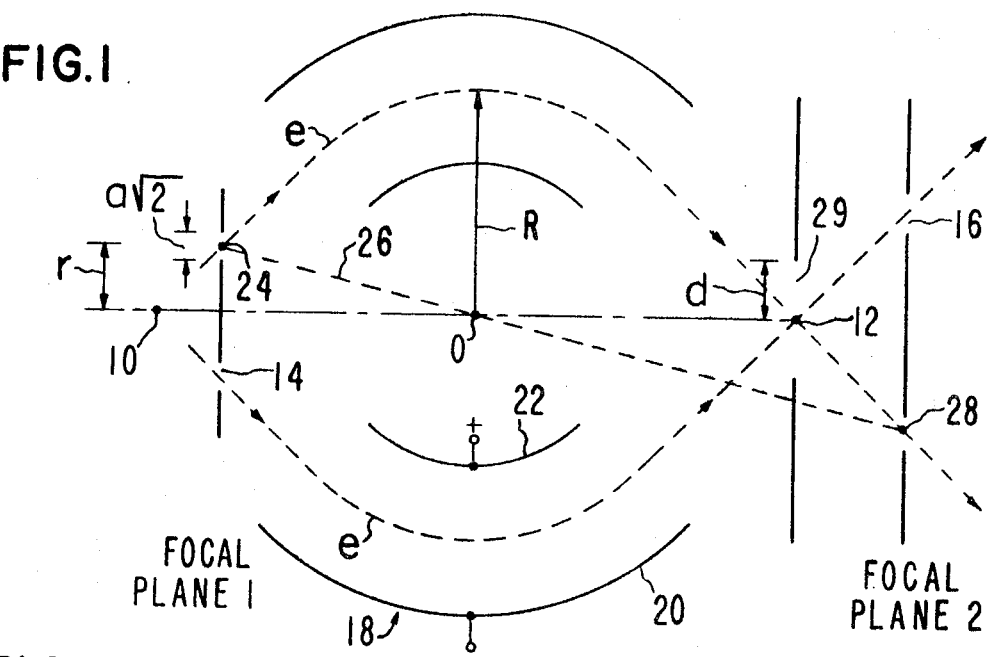
FIG.1
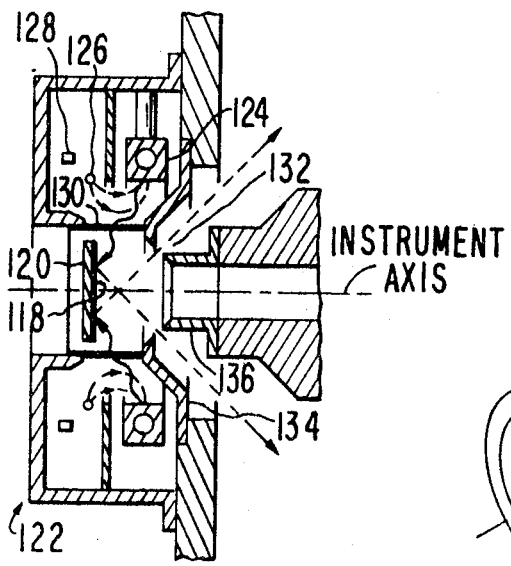
FIG.5
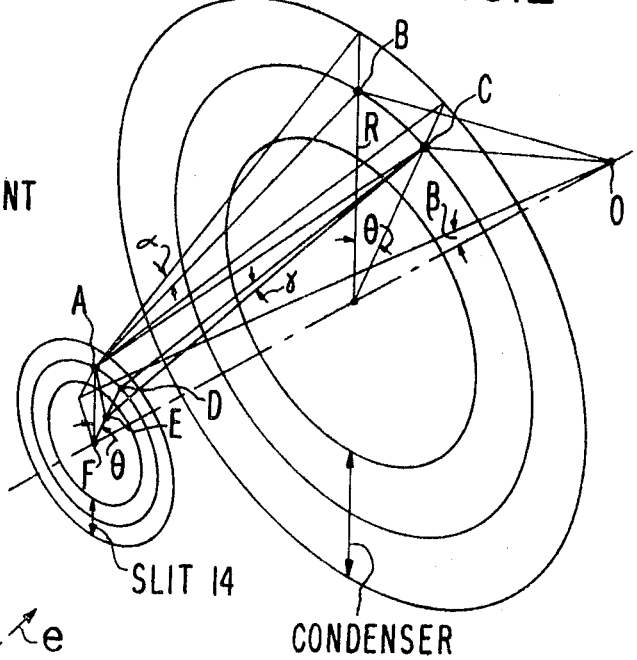
FIG.2
FIG.4
INVENTORS
JOHN C. HELMER
NORBERT H. WEICHERT
BY *Wm J Nolan*
ATTORNEY

APPARATUS FOR PERFORMING CHEMICAL ANALYSIS BY ELECTRON SPECTROSCOPY

This is a continuation of application Ser. No. 763,691 filed Sept. 30, 1968.

BACKGROUND OF THE INVENTION

In the field of chemical analysis generally referred to as Electron Spectroscopy for Chemical Analysis (ESCA) a given sample is bombarded with a source of radiant energy such as x-rays, ultra-violet light or high energy electrons such that an electron having initially a kinetic energy equal to the energy of the radiant photon is ejected from the sample. However, as each electron is emitted from the sample it will suffer an energy loss which is a result of the binding energy determined by the constitution of the atom. By measuring this energy it is possible to determine the way in which the various atoms of the sample are bound together. One can predict the elemental composition and the valence state of the atoms of the sample by measuring the binding energy of the emitted electrons.

Using this method, a chemist can determine the states of valency of certain atoms within a sample by irradiating the unknown sample with, for example, x-rays and then measuring the energy of the photo electrons produced so as to get a series of discrete photo electron energy spectra each one representing a different valence state of a particular atom. The change in electron energy due to a change in valence is called a chemical shift.

Investigators in the past few years have attempted to develop high resolution electron spectrometers suitable for carrying out this type of chemical analysis. The Siegbahn group at Uppsala has, for example, developed a spectrometer having a resolution high enough to enable energy analysis with sufficient precision to determine these types of chemical shifts. Their apparatus, however, was a very large instrument and one which was not well suited for use as a manufacturable analytical instrument. Their device is more related to high energy physics techniques than to any practical analytical tool for use in chemical laboratories.

The ESCA method differs from high energy physics in that the electron energies are generally considerably lower, on the order of 1,000 volts, for example, and they are passed directly into the spectrometer without changing their energy in any way. Using the ESCA method it is desirable that one be able to measure chemical shifts which are on the order of 1 volt. To measure 1 volt out of a thousand, a resolution of 1 part in a thousand is required, as a minimum. Thus, the basic problem is how to get such high resolution while at the same time providing a very sensitive analyzer, that is, one which has a very high current transmission and a fairly high average solid angle acceptance.

In practice, the electrons emitted from the sample are not emitted in large numbers, as one usually thinks of them. As the electron intensity is basically quite low and the detected electrons are counted one by one, it helps to have the very large machine of the prior art because theory shows that the sensitivity follows the square of the radius of curvature of the focusing medium. Therefore, if you double the radius of curvature of the analyzer, you obtain four times the sensitivity. In addition, the slit width theory shows that in order to obtain a resolution of 1 part in a thousand the slit width has to be near 1/1000th of the radius of curvature. So if one uses a small radius of curvature, he must also use a slit width that practically goes to zero.

Because all of these factors argue for the construction of a rather large instrument, of very precise dimensions, this is typically the tack which has been taken in the prior art. Therefore, the principal objective of the present invention is to provide a new method and apparatus in which the size of the instrument is substantially reduced in order to make it a practical analytical tool which can be made available to a much greater number of chemical laboratories and others interested in using the ESCA process.

SUMMARY OF THE PRESENT INVENTION AND THE PRINCIPLES UTILIZED THEREIN

The present invention relates generally to electron spectrometers and more particularly to a novel spherical electrostatic analyzer and associated apparatus for use in performing Electron Spectroscopy for Chemical Analysis.

The transmitted electron current of an ESCA spectrometer is determined by the brightness B of the electron illumination of the entrance slit where B is in units of electron current per unit area per unit solid angle multiplied by the luminosity $A\omega$ of the spectrometer where $A$ is the area of the entrance slit and $\omega$ is the solid angle aperture of the spectrometer as viewed from the entrance slit. In ESCA spectrometers the entrance slit rather than a source radiator surface is imaged at the detector slit. Thus, the transmitted current of mono-energetic electrons of the proper energy for transmission is given by the equation:

$$I = BA\omega \quad (1)$$

The brightness $B$ is determined by the strength of the incident radiation at the sample. Because the brightness is low, it has been necessary in the past to design spectrometers of exceptionally high luminosity $A\omega$. These prior art spectrometers have obtained second order focusing in one angle of the emission from the entrance slit. Here as well as in the present invention the luminosity of the ESCA spectrometer may be expressed in terms of the radius of curvature and the fractional resolution $\Delta E/E$ by the equation:

$$A\omega = CR^2(\Delta E/E)^2 \quad (2)$$

where
  $R$ is the radius of curvature of the beam centerline,
  $\Delta E$ is the line width in electron volts, and
  $E$ is the energy of the electron within the analyzer.

It may be seen that $R\Delta E/E$ is proportional to the slit width. The length of the slit together with the first order focusing angle $\beta$ gives rise to second order aberrations which are generally set equal in total to the width of the entrance slit. These then give rise to another factor $R\Delta E/E$ in the luminosity calculation. Thus, the luminosity is proportional to the square of the radius of curvature and to the square of the percentage resolution. The value of the constant depends upon a general type of spectrometer and the choice of the second order focusing angle $\alpha$.

Whereas, in the prior art instruments, $E$ in Equation (2) is the energy of the photo electrons emitted from the sample and is typically on the order of 1,000 electron volts, and the spectrometer is designed to achieve a resolution $\Delta E = 1$ electron volt or less in order to observe chemical shifts in the electron spectrum, in the spectrometer of the present invention $E$ is reduced by applying a variable retarding field between the sample and the entrance slit.

If, for example, $E$ is reduced from 1,000 electron volts to 100 electron volts, the luminosity of the instrument may be increased by a factor of 100 by increasing the slit width and the acceptance angle while keeping $\Delta E$ fixed. Furthermore, the dimensional precision of the instrument is relaxed by the larger value of $\Delta E/E$. However, the gain in transmitted current is not equal to 100 for the electron optical laws impose a reduction in brightness due to the retardation of source electrons.

The brightness of the electron beam is proportional to its kinetic energy and is therefore reduced in a retarding field. If $B_0$ is the electron brightness of the sample where photo electrons of energy $E_0$ are being produced, and $E$ is the kinetic energy of the electron as it passes through the entrance slit, the brightness at the entrance slit may be expressed as:

$$B = B_0/E_0 \, E. \quad (3)$$

Therefore a reduction in electron energy from 1,000 electron volts to 100 electron volts will result in a factor of 10 loss in brightness. Inserting Equation (3) and Equation (2) into Equation (1), the transmitted current may in general be given by the equation:

$$I = B_0 C R^2 \Delta E / E_0 E_2. \quad (4)$$

Thus, in spite of the loss in brightness due to electron retardation, the general opening of the spectrometer slit width and angular acceptance overcomes the loss in brightness to give a net gain in transmitted current by a factor of 10. This observation has not before been made by other workers in this field.

Since the energy spread of the source electron spectrum is not altered when all electrons are retarded by the same potential difference, the resolution $\Delta E$ of the spectrometer bears a constant relation to the energy difference between the adjacent peaks in the electron spectrum. In addition, Equation (4) indicates no limit to the increased transmission achieveable through the electron retardation at the source. The limit is imposed by practical considerations including the difficulty of focusing very slow electrons and in the design of very large aperture spectrometers.

It should be mentioned here that the brightness law in Equation (3) is independent of the shape of the electrode system by which retardation is produced. If a sample of small area is used then it may be necessary to provide electrodes which will image the source onto the entrance slit of the spectrometer. However, in the present ESCA method, one naturally obtains a large area of radiation from the x-ray tube or other source and it is convenient to use a sample of large area in conjunction with a simple retarding field.

The apparatus of the present invention incorporates the above principles and uses a spherical electrostatic analyzer of rotational symmetry along with certain other features which have not heretofore been found in the prior art. Whereas until now all electrostatic analyzers of rotational symmetry have employed point sources, of small diameter located on the axis of the instrument, which are imaged by the analyzer onto a small aperture at the opposite end of the spectrometer, the present invention utilizes instead of the point source, a slit which is in the form of an annular ring. In one preferred embodiment a cylindrical sample is incorporated within the annular slit and the sample is irradiated by an annular source such that the electrons emitted from the sample pass through the annular slit. The electrons are then energy selected by a spherical condenser and are imaged upon a similar annular exit slit whereafter they are passed through another focusing condenser which directs them into the aperture of an electron multiplier and a count of the particles is subsequently recorded.

It is therefore a principal object of our invention to provide a novel electron spectrometer of small size and very high sensitivity so as to enable the chemist to precisely measure the binding energies of the electrons surrounding the atoms of a given sample material.

Other objects and advantages of the present invention will become apparent after having read the following detailed disclosure of a preferred embodiment which makes frequent reference to the several figures of the drawing.

IN THE DRAWING

FIG. 1 is a schematic diagram illustrating the focusing principle used in the present invention.

FIG. 2 is an aberration diagram used to illustrate the operation of the present invention.

FIG. 4 is a diagram of an alternate source which may be incorporated into a system in accordance with the present invention.

FIG. 5 is a diagram of an alternate x-ray tube and sample which may be incorporated into the system.

DETAILED DESCRIPTION OF THE PREFERRED EMBODIMENTS

Figure 3:
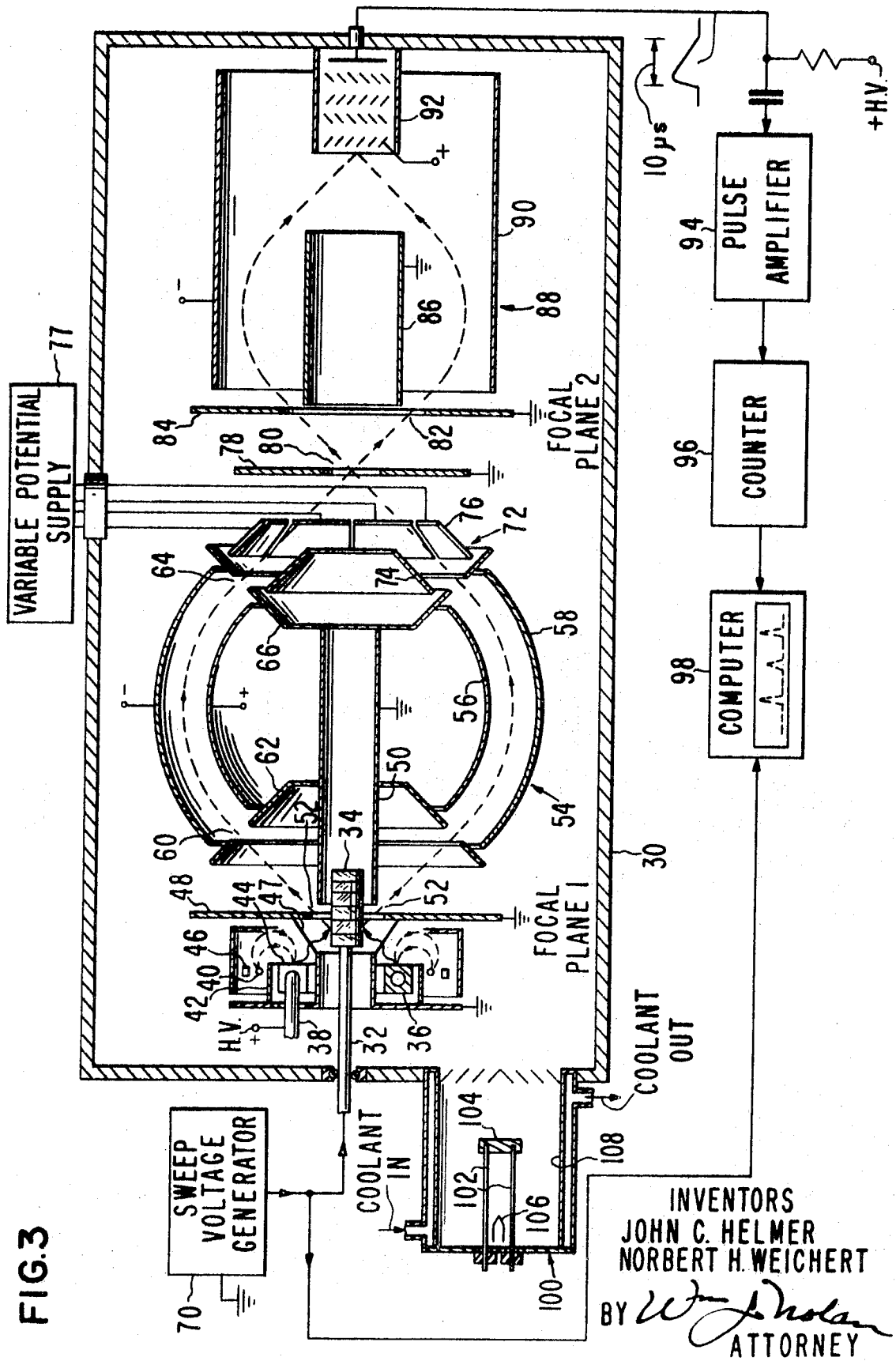
FIG. 3 is a schematic diagram of an ESCA spectrometer in accordance with the present invention.

Referring now to FIG. 1 of the drawing there is shown a cross section containing the axis of a spherical condenser of rotational symmetry, which is used to illustrate the focusing principle of the subject invention. The axial focal points are located at positions 10 and 12 and a pair of annular slits 14 and 16 are placed at focal planes 1 and 2 such that the slits lie on the cone of central rays that enter and leave the condenser. Located intermediate the focal points 10 and 12 is a spherical condensing means 18 comprised of a pair of electrostatic plates 20 and 22 which provide a spherical focusing means for focusing the electrons entering the slit 14 in focal plane number 1 into the annular slit 16 in focal plane number 2.

Considering a point 24 on the entrance slit 14 and drawing the line 26 through the center of curvature of the analyzer 18 the continuation of this line 26 is seen to intersect the point 28 on the central beam trajectory which is the first order image point. By sweeping the point 24 around the entrance slit 14 it is seen that the point 28 likewise traces out a circle in focal plane number 2 coinciding with the annular slit 16. Thus, a beam of electrons caused to pass through the annular slit 14 in the first focal plane defines an annular image in the second focal plane, and since the distance between point 24 and the center of curvature 0 of the analyzer 18 is shorter than the distance between point 28 and the center of curvature 0, the image slit 16 in focal plane number 2 is slightly larger than the source slit 14 in vocal plane number 1. It should be noted that the annular slits 14 and 16 could have been placed in planes intersecting the axial focal points 10 and 12 in which case there would have been unit magnification. However, this location places the slit position off the beam centerline and would therefore introduce additional undesirable aberrations.

The energy resolution (full width at half height) is given by the equation:

$$\Delta E/E = 3a/4R \tag{6}$$

when the instrument design is optimized such that the sum of all aberrations is equal to but not greater than the slit width $a$. $R$ is the radius of the central ray within the spherical condenser. Because the resolution does not directly involve a radius $r$ of the annular slit 14 a large slit area can be realized which enhances the sensitivity of the spectrometer.

The radius $r$ of the source slit 14 is ultimately limited by second order aberrations which are proportional to the squares of the angles $\alpha$, $\beta$, and $\gamma$, which are shown in FIG. 2. The angle $\alpha$ is produced by the entrance aperture of the condenser 18 of FIG. 1. Angles $\beta$ and $\gamma$ arise due to the trajectories such as AC which do not lie in an axial plane. From the source point A, a portion of the central trajectory is given by the line AB. This lies in a plane defined by ABO containing the axis of the analyzer FO where O is the center of curvature of the spherical condenser. If we consider a non-central trajectory such as AC, which enters the condenser aperture at point C and lies on the arc BC defined by an angle $\theta$ as shown, then because the spherical condenser produces a spherical electric field, the trajectory which passes through AC must lie entirely in the plane defined by ACO. plane lies at an angle $\beta$ with respect to the instrument axis and causes the particle to travel a longer path within the condenser. In addition, the central or normal ray through C passes through the point D on the annular source and it may be seen that relative to the point C, the source point A is lowered by a distance DE. This gives rise to an additional aberration defined by the angle $\gamma$.

The properties of the spherical field require all trajectories emanating from point A to define planes containing point O, the center of curvature. The Purcell condition then shows that all such rays have a common first order focal point on the exit slit. It may then be shown that second order aberrations produce displacements $\delta r$ from the first order focal point by an amount given by:

$$\delta r = 2R\alpha^2 + 2R\gamma^2 + R\beta^2. \tag{7}$$

If the slit width is $a$, then optimum design calculations indicate that the sum of these aberrations should be equal to $a$, and that separately we should set $$2R\alpha^2 = a/2 \tag{8}$$

and $$2R\gamma^2 + R\beta^2 = a/2. \tag{9}$$

Since $\gamma$ and $\beta$ are uniquely related to the azimuthal angle $\theta$, the second condition results in a limitation of the angle $\theta$ to a value less than that given by:

$$\theta \approx \sqrt{aR/r} \tag{10}$$

For given aberrations it is evident that the product of $\theta$ and the radius $r$ of the annular slit 14 is a constant. In FIG. 2 the arc length AD on the source slit is equal to $\theta r$ which therefore defines the maximum slit length from which a given point B on the condenser aperture can be irradiated. It therefore follows that the sensitivity of the spectrometer is roughly independent of the radius of the entrance slit as long as it exceeds that value for which $\theta$ equals $\pi$. It has been found, however, that for angles $\theta$ greater than or equal to $\pi/2$ the line shape of the spectrometer develops long wings and therefore it is desirable to limit $\theta$ to values less than $\pi/2$.

The above analysis also assumes the approximation that $r$ is much less than $R$, and the maximum allowed value of $r$ is therefore limited by this consideration. Within these boundaries the value of $r$ may be determined by other factors such as sample size, etc.

The azimuthal beam divergence angle $\theta$, shown in FIG. 2, is controlled by an aperture 29 placed at the cross-over point 12. If the angle $\theta$ is the chosen azimuthal acceptance angle then the radius $d$ of the cross-over aperture is given by the equation:

$$2 \sin \theta/2 = d/r \tag{11}$$

where
$r$ is the radius of slit 24.

It has also been found that the sensitivity of the spectrometer may be increased in accordance with Equation (4) if the energies of the photo-electrons are reduced before they fall upon the entrance slit of the spectrometer. Although the electron intensity is reduced in this process, one finds that when E is reduced the apertures of the spectrometer open up at a rate which overcomes the loss in source intensity such that the net current transmission is increased. If $E_o$ is the initial photo-electron energy and $E$ is its energy as it enters the analyzer, one finds that the current I transmitted by the spectrometer follows the relationship:

$$I \approx R^2 \Delta E/E_o E \tag{12}$$

In practice one would reduce the electron energy from $E_o \approx 1,000$ $eV$ to a value $E = 100$ $eV$, thereby increasing the transmitted current by a factor of 10. Alternatively, one might choose to reduce the analyzer radius of curvature R for practical purposes.

Referring now to FIG. 3 there is shown a preferred embodiment of the present invention. In this figure the vacuum chamber wall 30 is shown having a shaft 32 extending therethrough, one end of which is attached a sample cylinder 34 upon which a sample to be analyzed may be deposited. The sample cylinder 34 may be of any suitable length and is axially displaceable by movement of the shaft 32. Disposed about the axis of the shaft 32 is an annular x-ray anode 36 through which is passed a cooling fluid by means of the conduit 38 passing therethrough. The cylindrical anode 36 is typically made of stainless steel and has an aluminum coating evaporated on the surface thereof, or other metal whose characteristic x-radiation is desired.

Since the type of x-rays which are produced by the anode 36 depends upon the type anode material, aluminum has been chosen because it has a very narrow line shape and produces low energy photons. The lower photon energy causes lower energy electrons to emerge from the sample which are easier to analyze with the required degree of precision. Although aluminum is not the best target material available, since both magnesium and sodium would be more advantageous from the energy and linewidth standpoint, it has been found that aluminum is a practical material for this application.

In order to produce the high energy electrons for impingement upon the x-ray target an annular x-ray tube filament 40 is provided concentric with the anode 36. However, a cylindrical shielding member 42 is likewise provided immediately between the filament 40 and anode 36 so as to cause the electrons emitted from the filament 40 to be diverted around the shielding member 42 so as to strike the face 44 of the anode 36 and emit x-rays in the direction of the cylindrical sample 34.

Since this type of instrument is very sensitive to even very small magnetic fields and since the current flowing in the filament 40 would tend to create a magnetic field in the entrance portion of the analyzer, a current return bus 46 which is formed concentric with the filament 40 is provided for cancelling the magnetic effects of the current in the filament 40. The current return bus 46 is electrically connected in series with the filament 40 and is arranged so that the current flow in the bus 46 is in the opposite direction to that of the filament 40, thus effectively cancelling the magnetic effect thereof.

In this embodiment of the invention the filament 40 is at ground potential and the target anode 36 is at a high positive voltage. By choosing such a potential arrangement the possibility of extraneous electrons entering the system can be substantially reduced. This is a significant feature of the invention, since the counting range of the apparatus can be as low as 10 electrons per second at the detector. It can easily be seen that any extraneous electrons entering into the analyzer would materially affect any readings obtained.

In order to provide a filter for the x-rays impinging on the sample 34 a very thin aluminum foil 47 on the order of a few tenths of a mil in thickness is disposed across the x-ray path between the anode 36 and the sample 34. The purpose of this filter is to block the lower energy x-rays produced by the aluminum anode.

The sample 34 is positioned within the circular aperture in the plate 48 which, together with the tubular member 50 disposed about the axis of the sample and into which the sample may be projected, provide an entrance slit 52 through which the photo-electrons emitted by the sample enter into the spherical condenser 54. The condenser 54 is comprised of a pair of truncated concentric spherical plates 56 and 58 which form a spherical focusing means for focusing the electrons emerging from the slit 52 so that they are caused to pass through a subsequent focusing aperture 60 provided in the plate 62 which is mounted on the tube 50 and serves as an entrance aperture to the electrostatic focusing means 54. A similar aperture 64 is provided in a plate 66 at the exit end of the spherical focusing means 54. The electrostatic focusing means 54 has a positive voltage applied to the inner electrode 56 and a negative voltage applied to the outer electrode 58.

Referring back for a moment to the slit 52, it will be noted from the drawing that the plate 48 and tubular member 50 are placed at ground potential and that a variable potential source 70 is provided for sweeping the potential applied to the sample 34. This creates a variable retarding field between the sample electrode 34 and the slit 52 which enables one to vary the energy of the electrons entering the analyzer and thus sweep the energy spectrum of the electrons emitted from the sample. Although it is possible to sweep the spectrum of the emitted electrons using other methods, the use of the retarding field method has substantial operating advantages in that it is not necessary to change the potentials applied to the spherical focusing electrodes of the analyzer 54. Thus, the sweep function may be provided in this apparatus without changing any of the operational parameters of the analyzer proper.

At the exit end of the spherical analyzer 54, there are placed a set of focusing electrodes 72 which are comprised of an inner plate 74 and a segmented outer plate 76. This focusing means is required to insure that the resulting image forms a perfect circle when imaged on focal plane 2. Although this is ideally accomplished by the spherical plates 56 and 58, as a matter of practicality this does not happen due to the sensitivity of the device to perturbations from small dimensional imperfections and from residual magnetic fields of various kinds which combine to cause the image to be somewhat displaced and out of shape. These electrodes 74 and 76 are somewhat like a continuation of the condenser itself, except that the electrode 76 is segmented, preferably into at least 8 equal segments, and the potential applied by means of a potential supply means 77 to each of these 8 segments is variable so that the circuity of the emerging electrons can be altered to form a perfect circle. The reason for doing this of course is to enable the adjustment of the position and shape of the final image.

As discussed previously with regard to FIG. 2, there are certain sample electrons which enter the focusing means 54 at an angle to the plane which includes the axis of the device. These electrons are aberrational in nature and in order to maintain high device resolution it is desirable that only those electrons within a predetermined aberration range be allowed to reach the second focal plane. In order to eliminate these extraneous electrons an apertured plate 78 is inserted in the path of the electrons exiting from the focusing condenser 54. The plate 78 is positioned at the cross-over point of the centermost electrons emerging from the focusing condenser 54. The annular opening has a diameter which is large enough to accept only those aberrational electrons which enter the analyzer with angles less than a predetermined deviation. Thus, the deviation angle $\theta$ referred to in discussing FIG. 2 is controlled entirely by the size of the aperture 80 and by choosing an appropriate diameter for this aperture the acceptable angle $\theta$ is defined.

Another aberrational trajectory is controlled by the aperture 60 and is that defined in FIG. 2 by the angle $\alpha$. This is an angle in a radial plane and the maximum allowable angle $\alpha$ is selected by the size of the aperture 60.

After the electrons emerging from the focusing medium 54 pass through the cross-over point at opening 80, they follow a conically diverging path to a second focal plane where a second annular slit 82 is provided for receiving the desired electrons. The slit 82 is formed by a plate 84 having a circular opening therein and the cylindrical electrode 86 the end of which is positioned within the aperture in the plate 84. As will be noted in the drawing, both the plate 84 and the cylindrical electrode 86 are at ground potential.

After the electrons pass through the slit 86 they enter another focusing condenser 88 which includes the cylindrical electrodes 86 and 90 which when biased as shown in the drawing produce an electrostatic field therebetween which eliminates extraneous electrons and causes the accepted electrons to be focused onto the entrance aperture of an electron multiplier 92. Each electron which enters the electron multiplier 92 produces an output pulse which is amplified by a pulse amplifier 94 and is then counted by a counter 96 and is subsequently recorded in a multi-scaling computer 98 such as the CAT-400. The negative voltage on electrode 90 is also an important agent in preventing extraneous low energy electrons from entering the electron multiplier.

The sweep of the computer 98 is synchronized with the sweep generator 70 which applies the sweep voltage to the sample 34. With each sweep the computer 98 performs a multi-channeled addition and storage operation which when reproduced on an oscilloscope or recording mechanism will produce a graphical indication of the energy spectrum of the sample scanned by the spectrometer.

As is usual in this type of device it is necessary that the spectrometer be operated in a high vacuum. Thus, a vacuum maintaining means 100 is provided as shown extending into the vacuum chamber wall 30 of the spectrometer. Since, as mentioned before, the spectrometer is extremely sensitive to very minute magnetic perturbations, in the miligauss range for example, it is necessary that the pump 100 produce no magnetic fields which could introduce a magnetic field into the spectrometer.

A titanium sublimation pump of the type depicted in the drawing has been found suitable for this application. This pump comprises a pair of rods 102 which support a titanium slug 104 to which a high voltage is applied from an external source. A filament 106 is likewise provided for producing a steady stream of electrons which bombard the titanium slug 104 causing it to sublimate and mix with the gases in the system so as to chemically combine with these gases the strongly bonded composite of which is plated onto the water cooled surface 108 of the pump 100.

Referring now to FIG. 4 there is shown an embodiment of an alternate sample carrying structure and x-ray source which could be used in place of the sample irradiating mechanism disclosed previously. In this alternative embodiment a conical anode 110 is provided so as to be bombarded by an electron beam from a filament 112 thus producing x-rays which impinge upon a sample material deposited on the inside surface of a generally annular sample carrying structure 114 in the form of a frustrum of a cone. As the photo-electrons are emitted from the sample they are allowed to pass through an annular slit 116 as in the previously described structure except that they cross the axis of the structure before entering the spherical analyzing condenser 54.

Another alternative sample carrying and irradiating embodiment is illustrated in FIG. 5. The sample material coats the face 118 of the sample plate 120 which is positioned within the sample cavity 122 and lies in a plane normal to the instrument axis. As in the embodiment of FIG. 3 the sample 118 is irradiated by an x-ray source including an annular anode 124, filament means 126 and bus means 128, and a thin aluminum foil 130 which serves to block very low energy x-rays produced at the anode 124.

An entrance aperture 132 lying in a focal plane of the energy analyzer means of the system, such as the electrostatic analyzer shown in FIG. 3, for example, is defined by an apertured member 134 and the end of the cylindrical member 136. As the photo-electrons are emitted from the sample 118 in response to bombardment by the annular x-ray source 124 they pass through the slit means 132 and into the analyzer means which performs an energy selection function and focuses those electrons of selected energies onto a detection means as illustrated in FIG. 3.

Returning now to FIG. 3 the operation of the device will be described. Initially, the cylindrical sample holder 34 may be coated with as many different types of sample material as it is desired to analyze. These sample coatings are deposited on the surface of the sample holder 34 forming annular rings which can be selectively bombarded by the x-rays from the anode 44 by simply moving the sample holder 34 along its axis. As the sample is bombarded by the x-rays, photo-electrons are emitted therefrom and are caused to pas through the slit 52 and into the cylindrical analyzer 54 which in turn causes them to be focused upon a second plane.

The energy spectrum of the sample material is swept by applying a variable voltage to the sample 34 while the surfaces 48 and 50 defining the slit 52 are maintained at ground potential. Thus, a desired energy level of sample electrons can be selected for admission to the spherical focusing means 54. In general practice the potential applied to the sample is provided by a sweep generator 70 which can be caused to alternate over any predetermined sweep voltage range.

As the electrons emerge from the focusing means 54 the potentials applied to the segmented portions 76 of the secondary focusing means 72 are adjusted so as to align the electron image with the image aperture 82 in focal plane 2.

As previously described those aberrational electrons which enter the spherical analyzer 54 at angles other than within the range selected will be rejected by the plates 60 and 78. The remaining focused electrons will pass through the annular opening 82 and into the cylindrical condenser means 88 where they are focused upon the entrance to an electron multiplier 92. As each electron enters the multiplier 92 an output pulse is produced which is amplified by the pulse amplifier 94 and is counted by the counter 96. The counted result is then applied to a multi-channeled computer which stores the input data and produces an energy spectrum representative of the sample material being investigated.

Whereas the analyzer and electron focusing means disclosed herein are electrostatic, it is contemplated that a magnetic equivalent could be substituted for either the spherical analyzer means or the analyzer exit correction means or for both the analyzer and exit correction means. It is likewise contemplated that the sample and irradiation means may take different forms to accommodate the various uses to which the apparatus will find application.

After having read the above disclosure it will become apparent that many other alterations and modifications may be made to the disclosed apparatus without departing from the merits of the invention. It is therefore to be understood that this description is for purposes of illustration only and is in no manner intended to be limiting in any way. Furthermore, we intend that the appended claims be interpreted as covering all modifications which fall within the true spirit and scope of our invention.

What is claimed is:

1. Electron spectrometer apparatus comprising:
   means for irradiating a sample material so as to cause electrons to be emitted therefrom,
   electron detection means, and
   electron energy analyzer means disposed between said sample material and said detection means, said energy analyzer means including
   annular slit means disposed proximate said sample material so that said electrons are caused to pass therethrough and
   a spherical electrostatic condenser means which performs an energy selection and focusing function such that the energy spectrum of the electrons emitted from said sample material and passing through said slit means may be examined, said slit means lying in a focal plane of said analyzer means such that said analyzer causes electrons of selected energies to be focused into said detector means.

2. Electron spectrometer apparatus as recited in claim 1 wherein means are provided for applying a variable potential between said sample material and said slit means so as to produce a variable retarding field for selectively altering the energy of the electrons passing into said energy analyzer means through said slit means.

3. Electron spectrometer apparatus as recited in claim 1 wherein said sample material is disposed on a generally cylindrical sample electrode positioned coaxial with said annular slit means.

4. Electron spectrometer apparatus as recited in claim 3 wherein an annular source of irradiation is provided coaxial with said sample electrode so that a circumferential area of said sample electrode may be irradiated.

5. Electron spectrometer apparatus as recited in claim 1 wherein said energy analyzer means includes a spherical electrostatic condenser means which performs an energy selection and focusing function such that the energy spectrum of the charged particles emitted from said sample material may be examined.

6. Electron spectrometer apparatus as recited in claim 1 wherein said energy analyzer means includes a second annular slit means lying in a second focal plane of said energy analyzer means and a cylindrical electrostatic condenser means for focusing the electrons passing through said second annular slit means onto said electron detector.

7. Electron spectrometer apparatus as recited in claim 1 wherein the central trajectories of the electrons traveling between said slit means and said detection means have a cross-over point on a central axis and including an aperture means placed at said cross-over point for limiting the angular divergence of said electrons.

8. Electron spectrometer apparatus as recited in claim 1 including a set of concentric frusto-conical electrostatic correctional electrodes, at least one of which is subdivided into a plurality of arcuate segments, provided at an end of said spherical condenser means so as to enable focusing corrections to be made to the electrons at the exit end of said analyzer means.

9. Electron spectrometer apparatus as recited in claim 1 wherein said sample irradiation means comprises an annular x-ray source positioned coaxial with said slit means and relative to said sample such that electrons emitted from said sample are directed through said annular slit means and into said energy analyzer means.

10. Electron spectrometer apparatus as recited in claim 9 wherein said sample material forms a planer surface lying normal to the axis of said slit means.

11. Electron spectrometer apparatus as recited in claim 9 wherein said x-ray source includes an annular anode means and an annular filament means coaxial therewith, said filament means including a filamentary conductor and an annular current supply bus means positioned coaxial with and adjacent said filamentary conductor, the two being series connected but arranged such that the current in said bus means flows in the opposite direction to that flowing in the adjacent filamentary conductor thus cancelling any magnetic field created by said filamentary conductor.

12. A method for performing electron spectroscopy which comprises:
    irradiating a sample material so as to cause electrons to be emitted therefrom,
    providing a slit means proximate said sample material so that said electrons are caused to pass therethrough into an analyzer means which performs an energy selection thereon and focuses selected electrons onto a detector means, and
    applying a potential between said sample material and said slit means sufficient to substantially reduce the energies of the electrons passing through said slit means thus enabling the use of unusually wide slit widths and angular electron acceptance apertures.

13. Electron spectrometer apparatus comprising:
    means for irradiating a sample material to produce electron emission therefrom,
    an electron detector means for detecting electrons, and an energy analyzer positioned in the path of said electron emission between said sample material and said detector for selecting electrons in accordance with the energies thereof, said analyzer including
    a focusing means of rotational symmetry about a central axis,
    a first means forming an annular slit positioned in a first focal plane between said sample material and said focusing means and in axial alignment with said central axis for passing said electrons into said focusing means in a beam of annular cross-section, a second means forming an annular slit positioned in a second focal plane between said focusing means and said detector means and in axial alignment with said central axis, the annular beam at said second focal plane imaging the beam at said first focal plane, and means forming an aperture positioned between the two annular slits normal to and axially aligned with said central axis and positioned at the cross-over point of the electron central trajectory in the beam.

14. Electron spectrometer apparatus as claimed in claim 13 including means for applying a variable potential between said sample material and said first slit means to produce a variable retarding field therebetween for selectively altering the energy of the charged particles passing through said first slit means and into said focusing means.

15. Electron spectrometer apparatus as claimed in claim 15 including a sample electrode for holding said sample positioned coaxial with said first annular slit means.

16. Electron spectrometer apparatus as claimed in claim 15 wherein said irradiation means includes an annular source of irradiation coaxial with said sample electrode so that a circumferential area of said sample electrode is irradiated.

17. An electron spectrometer apparatus as claimed in claim 13 including a set of annularly disposed focusing electrodes aligned with said central axis and positioned between said focusing means and said second slit means, and means for varying the potential applied across said set of focusing electrodes to control the beam image at said second slit means.

18. An electron spectrometer apparatus as claimed in claim 17 wherein one of the focusing electrodes in said set is subdivided into a plurality of arcuate segments.

19. Electron spectrometer apparatus as claimed in claim 13 wherein said means forming an aperture comprises a plate having an axially aligned opening therein and positioned between said focusing means and said second focal plane.

20. Electron spectrometer apparatus as claimed in claim 13 wherein said focusing means is a spherical con-denser and wherein $$\theta \approx \sqrt{aR/r}$$

and $$2 \sin \theta/2 = d/r$$

where $\theta$ is the azmithal beam divergence angle in a surface normal to the central axis at the focusing means entrance aperture, $a$ is the entrance slit width normal to the electron central trajectory therethrough, $R$ is the radius of curvature of the beam centerline in the spherical condenser, $r$ is the radius of the annular slit in the first focal plane, and $d$ is the radius of the aperture at the cross-over point.

21. Electron spectrometer apparatus comprising:

means for irradiating a sample material to produce electron emission therefrom, an energy analyzer apparatus into which said electrons pass for selecting among said emitted electrons in accordance with the energies thereof, and a detector means for detecting the selected electrons passing from said energy analyzer, said energy analyzer apparatus comprising an electrostatic focusing means of rotational symmetry about a central axis positioned in the path of said electron emission for selecting electrons passing therethrough in accordance with the energies thereof, a first means forming an annular slit positioned in one focal plane at the entrance end of said focusing means for passing said electrons into said focusing means in a beam of annular cross-section, and a second means forming an annular slit positioned in a second focal plane on the other side of said focusing means such that only electrons of a particular energy range will pass through both of said annular slits, and a set of focus electrodes positioned between said two focal planes for controlling the beam image at one plane relative to the other plane.

22. Electron spectrometer apparatus as claimed in claim 21 including means for applying a variable potential between said sample material and said first slit means to produce a variable retarding field for selectively altering the energy of the electrons passing through said first slit means and into said focusing means.

23. Electron spectrometer apparatus as claimed in claim 21 including a sample electrode for holding said sample positioned coaxial with said first annular slit means.

24. Electron spectrometer apparatus as claimed in claim 23 wherein said irradiation means includes an annular source of irradiation coaxial with said sample electrode so that a circumferential area of said sample electrode is irradiated.

25. Electron spectrometer apparatus as claimed in claim 21 including means forming an aperture comprising a plate having an axially aligned opening therein and positioned between said focusing means and said second focal plane.

26. Electron spectrometer apparatus as claimed in claim 25 wherein said focusing means is a spherical condenser and wherein $$\theta \approx \sqrt{aR/r}$$

and $$2 \sin \theta/2 = d/r$$

where $\theta$ is the azmithal beam divergence angle in a surface normal to the central axis at the focusing means entrance aperture, $a$ is the entrance slit width normal to the electron central trajectory therethrough, $R$ is the radius of curvature of the beam centerline in the spherical condenser, $r$ is the radius of the annular slit in the first focal plane, and $d$ is the radius of the aperture at the cross-over point.

27. Electron spectrometer apparatus comprising:

means for irradiating a sample material to produce electron emission therefrom, a first focusing condenser of rotational symmetry about a central axis positioned in the path of said electron emission from said sample for selecting electrons in accordance with the energies thereof, a first means forming an annular slit positioned in a first focal plane between said sample material and said first focusing condenser for passing said electrons into said first focusing condenser in a beam of annular cross-section, a second focusing condenser of rotational symmetry about said central axis positioned in the path of the electrons passing from said first focusing condenser for selecting electrons in accordance with the energies thereof, a detector means for detecting the selected electrons passing from said second focusing condenser, and a second means forming an annular slit positioned in a second focal plane between said first and second focusing condensers, the annular electron beam at said second focal plane imaging the beam at said first focal plane.

28. Electron spectrometer apparatus as claimed in claim 27 including means for applying a variable potential between said sample material and said first slit means to produce a variable retarding field for selectively altering the energy of the charged particles passing through said first slit means and into said first focusing condenser.

29. Electron spectrometer apparatus as claimed in claim 27 including a sample electrode for holding said sample material positioned coaxial with said first annular slit means.

30. Electron spectrometer apparatus as claimed in claim 27 wherein said irradiation means includes an annular source of irradiation coaxial with said sample electrode so that a circumferential area of said sample electrode is irradiated.

31. An electron spectrometer apparatus as claimed in claim 27 including
a pair of annular focusing electrodes aligned with said central axis and positioned between said first focusing condenser and said second slit means,
and means for varying the potential applied across said pair of annular focusing electrodes to control the beam image at said second slit means.

32. Electron spectrometer apparatus as claimed in claim 27 including means forming an aperture normal to and axially aligned with said central axis and positioned at the cross-over point of the electron central trajectory in the beam.

33. Electron spectrometer apparatus as claimed in claim 32 wherein said first focusing condenser is a spherical condenser and wherein $$\theta \approx \sqrt{aR/r}$$

and $$2 \sin \theta/2 = d/r$$

where $\theta$ is the azmithal beam divergence angle in a surface normal to the electron central trajectory through the focusing condenser entrance aperture, $a$ is the entrance slit width normal to the electron central trajectory therethrough, $R$ is the radius of curvature of the beam centerline in the spherical focusing condenser, $r$ is the radius of the annular slit in the first focal plane, and $d$ is the radius of the aperture at the cross-over point.

34. Electron spectrometer apparatus comprising:
means for irradiating a sample material to produce electron emission therefrom,
an energy analyzer apparatus into which said electrons pass for selecting among said emitted electrons in accordance with the energies thereof, and
a detector means for detecting the selected electrons passing from said energy analyzer,
said energy analyzer apparatus comprising
a first electrostatic focusing means of rotational symmetry about a central axis positioned in the path of said electron emission for selecting electrons passing therethrough in accordance with the energies thereof,
a second electrostatic focusing means of rotational symmetry about said central axis aligned with said first condenser and positioned in the path of said electron emission for selecting electrons passing therethrough in accordance with the energies thereof,
a first means forming an annular slit positioned in one focal plane between said first and second focusing means for passing said electrons from one focusing means into the other focusing means in a beam of annular cross-section,
and a second means forming an annular slit positioned in another focal plane on the other side of one of said focusing means such that only electrons of a particular energy range will pass through both of said annular slits.

35. An electron spectrometer apparatus as claimed in claim 39 including means in said energy analyzer forming an aperture normal to and axially aligned with said central axis and positioned at the cross-over point at the central axis of the electron central trajectory in the beam.

36. An electron spectrometer apparatus as claimed in claim 35 wherein one of said focus means comprises a spherical electrostatic condenser and wherein $$\theta \approx \sqrt{aR/r}$$

and $$2 \sin \theta/2 = d/r$$

where $\theta$ is the azmithal beam divergence angle in a surface normal to the central axis at the spherical electrostatic condenser entrance aperture, $a$ is the entrance slit width normal to the electron central trajectory therethrough, $R$ is the radius of curvature of the beam centerline in the spherical condenser, $r$ is the radius of the annular slit in the first focal plane, one of said focal planes at an end of said spherical condenser, and $d$ is the radius of the aperture at the cross-over point.

37. An electron spectrometer apparatus as claimed in claim 35 wherein said aperture means is positioned between said first and second focusing means.

38. An electron spectrometer apparatus as claimed in claim 34 including means producing a variable retarding field along the path of the electron beam for selectively altering the energy of the electrons passing into at least one of said focusing means.

39. An electron spectrometer apparatus as claimed in claim 38 wherein said means producing said variable retarding field comprises means for applying a variable potential between said sample material and said energy analyzer to produce said variable retarding field.

40. An electron spectrometer apparatus as claimed in claim 34 including a set of focusing electrodes positioned in the energy analyzer and between said first and second slit forming means for controlling the electron beam image at one focal plane relative to the other focal plane.

* * * * *